United States Patent
Ko

(10) Patent No.: US 9,235,007 B2
(45) Date of Patent: Jan. 12, 2016

(54) CONNECTOR OPTICAL LENS WITH ALIGNMENT FEATURES

(71) Applicant: Jamyuen Ko, San Jose, CA (US)

(72) Inventor: Jamyuen Ko, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/050,252

(22) Filed: Oct. 9, 2013

(65) Prior Publication Data

US 2014/0037246 A1    Feb. 6, 2014

Related U.S. Application Data

(63) Continuation of application No. 12/887,325, filed on Sep. 21, 2010, now Pat. No. 8,565,562.

(51) Int. Cl.
*G02B 6/36* (2006.01)
*G02B 6/32* (2006.01)
*G02B 6/38* (2006.01)

(52) U.S. Cl.
CPC .............. *G02B 6/32* (2013.01); *G02B 6/3817* (2013.01); *G02B 6/3839* (2013.01); *G02B 6/3885* (2013.01); *G02B 6/3853* (2013.01); *Y10T 29/49117* (2013.01)

(58) Field of Classification Search
CPC ...... G02B 6/32; G02B 6/4206; G02B 6/4214; G02B 6/4204; G02B 6/4246
USPC ................ 385/15, 31, 33, 39, 53, 88, 91, 92
See application file for complete search history.

(56) References Cited

U.S. PATENT DOCUMENTS

| | | |
|---|---|---|
| 4,082,421 A | 4/1978 | Auracher et al. |
| 4,781,431 A | 11/1988 | Wesson et al. |
| 4,944,568 A | 7/1990 | Danbach et al. |
| 5,109,452 A | 4/1992 | Selvin et al. |
| 5,241,612 A | 8/1993 | Iwama |
| 5,242,315 A | 9/1993 | O'Dea |
| 5,515,467 A | 5/1996 | Webb |
| 6,179,627 B1 | 1/2001 | Daly |

(Continued)

FOREIGN PATENT DOCUMENTS

| | | |
|---|---|---|
| CN | 87216477 | 8/1998 |
| CN | 2475175 | 1/2002 |

(Continued)

OTHER PUBLICATIONS

PCT Int'l Search Report and Written Opinion for Int'l Application No. PCT/US2009/058304, mailed Apr. 30, 2010, 11 pgs.

(Continued)

*Primary Examiner* — Jennifer Doan
(74) *Attorney, Agent, or Firm* — Blakely, Sokoloff, Taylor & Zafman LLP

(57) ABSTRACT

An optical lens of an optical connector includes alignment features for passive connection alignment. Fiber inserted into the lens is aligned with a fiber groove that restricts motion in at least one direction to align the fiber. The lens includes an alignment feature to passively align the lens with a mating alignment feature of a mating connector. The groove may, for example, be L-, V-, or U-shaped. The alignment feature can be a post with corresponding recess. Alignment can further be secured with a tab that constrains pivoting of the connectors when engaged.

5 Claims, 8 Drawing Sheets

(56) References Cited

U.S. PATENT DOCUMENTS

| | | | |
|---|---|---|---|
| 6,302,591 B1 | 10/2001 | Nagaoka et al. | |
| 6,356,692 B1 | 3/2002 | Ido et al. | |
| 6,478,625 B2 | 11/2002 | Tolmie et al. | |
| 6,499,889 B1 | 12/2002 | Shirakawa et al. | |
| 6,500,026 B2 | 12/2002 | Yamaguchi | |
| 6,584,519 B1 | 6/2003 | Russell | |
| 6,739,766 B2 | 5/2004 | Xu et al. | |
| 6,755,575 B2 | 6/2004 | Kronlund et al. | |
| 6,964,578 B2 | 11/2005 | Clark et al. | |
| 6,981,887 B1 | 1/2006 | Mese et al. | |
| 7,077,686 B2 | 7/2006 | Seo et al. | |
| 7,160,032 B2 | 1/2007 | Nagashima et al. | |
| 7,182,646 B1 | 2/2007 | Chou et al. | |
| 7,213,979 B2 | 5/2007 | Park | |
| 7,234,874 B2 * | 6/2007 | Morse et al. | 385/53 |
| 7,338,217 B2 * | 3/2008 | Morimoto et al. | 385/88 |
| 7,347,632 B2 | 3/2008 | Farr | |
| 7,354,205 B2 | 4/2008 | Sakata et al. | |
| 7,374,349 B2 | 5/2008 | Wang | |
| 7,446,298 B1 | 11/2008 | Stone | |
| 7,458,732 B2 | 12/2008 | Harano et al. | |
| 7,494,287 B2 | 2/2009 | Wang et al. | |
| 7,572,071 B1 | 8/2009 | Wu | |
| 7,614,802 B2 | 11/2009 | Morioka | |
| 7,659,551 B2 | 2/2010 | Loh | |
| 7,699,663 B1 | 4/2010 | Little et al. | |
| 7,717,733 B1 | 5/2010 | Yi et al. | |
| 7,798,726 B2 | 9/2010 | Sabo | |
| 7,815,469 B1 | 10/2010 | Nguyen et al. | |
| 7,876,989 B2 | 1/2011 | Aronson et al. | |
| 7,883,371 B1 | 2/2011 | Chen et al. | |
| 7,887,243 B2 | 2/2011 | Abel et al. | |
| 7,896,559 B2 | 3/2011 | Yi et al. | |
| 7,985,026 B1 | 7/2011 | Lin et al. | |
| 8,118,497 B2 | 2/2012 | Yi | |
| 8,251,593 B2 | 8/2012 | Liao et al. | |
| 8,262,296 B2 | 9/2012 | Liao et al. | |
| 8,388,241 B2 | 3/2013 | He et al. | |
| 8,398,314 B2 | 3/2013 | Ko et al. | |
| 8,403,568 B2 | 3/2013 | Wang et al. | |
| 8,498,508 B2 | 7/2013 | Lin | |
| 8,554,030 B2 | 10/2013 | Noguchi | |
| 8,565,562 B2 | 10/2013 | Jamyuen | |
| 8,613,561 B2 | 12/2013 | Ko et al. | |
| 8,651,749 B2 | 2/2014 | Dainese, Jr. et al. | |
| 8,678,672 B2 | 3/2014 | Wu | |
| 8,702,319 B2 | 4/2014 | Wu | |
| 8,702,325 B2 | 4/2014 | Wu | |
| 8,905,653 B2 | 12/2014 | Wu | |
| 9,039,304 B2 | 5/2015 | Ko et al. | |
| 2002/0004336 A1 | 1/2002 | Yamaguchi | |
| 2002/0006748 A1 | 1/2002 | Tolmie et al. | |
| 2002/0102066 A1 | 8/2002 | Nishita | |
| 2003/0053766 A1 | 3/2003 | Cheng et al. | |
| 2003/0053767 A1 | 3/2003 | Cheng et al. | |
| 2003/0133687 A1 | 7/2003 | Han et al. | |
| 2003/0229749 A1 | 12/2003 | Saito et al. | |
| 2004/0042735 A1 | 3/2004 | Ma | |
| 2004/0105629 A1 | 6/2004 | Cheng et al. | |
| 2004/0105630 A1 | 6/2004 | Cheng et al. | |
| 2004/0105631 A1 | 6/2004 | Cheng et al. | |
| 2004/0153595 A1 | 8/2004 | Sukegawa et al. | |
| 2004/0184738 A1 | 9/2004 | McColloch et al. | |
| 2004/0218372 A1 | 11/2004 | Furuyama et al. | |
| 2005/0156304 A1 | 7/2005 | Furuyama et al. | |
| 2005/0180700 A1 | 8/2005 | Farr | |
| 2006/0039655 A1 | 2/2006 | Wilson | |
| 2006/0056779 A1 | 3/2006 | Wang | |
| 2006/0088251 A1 | 4/2006 | Wang et al. | |
| 2006/0093285 A1 | 5/2006 | Park | |
| 2006/0239619 A1 | 10/2006 | Luther et al. | |
| 2006/0263012 A1 | 11/2006 | Yamazaki | |
| 2006/0274394 A1 | 12/2006 | Riley et al. | |
| 2006/0291784 A1 | 12/2006 | Wang et al. | |
| 2007/0049119 A1 | 3/2007 | Fujimoto et al. | |
| 2007/0105452 A1 | 5/2007 | Gerlach et al. | |
| 2007/0122156 A1 | 5/2007 | Wang et al. | |
| 2008/0025676 A1 | 1/2008 | Wang | |
| 2008/0044143 A1 | 2/2008 | Wang et al. | |
| 2008/0112707 A1 | 5/2008 | Mongold | |
| 2008/0131058 A1 | 6/2008 | Tsunoda et al. | |
| 2008/0320200 A1 | 12/2008 | Pederson et al. | |
| 2009/0154878 A1 | 6/2009 | Noguchi | |
| 2009/0154884 A1 | 6/2009 | Chen et al. | |
| 2009/0274422 A1 | 11/2009 | Henry et al. | |
| 2009/0324176 A1 | 12/2009 | Cheng et al. | |
| 2010/0046891 A1 | 2/2010 | Sabo | |
| 2010/0080519 A1 | 4/2010 | Ko et al. | |
| 2010/0104244 A1 | 4/2010 | Grinderslev | |
| 2010/0124845 A1 | 5/2010 | Sabo et al. | |
| 2010/0158448 A1 | 6/2010 | Yi et al. | |
| 2010/0226612 A1 | 9/2010 | Sedio et al. | |
| 2010/0278490 A1 | 11/2010 | Liao et al. | |
| 2010/0290745 A1 | 11/2010 | Liao et al. | |
| 2010/0303420 A1 | 12/2010 | Lin et al. | |
| 2011/0021088 A1 | 1/2011 | Chen et al. | |
| 2011/0026885 A1 | 2/2011 | Lin | |
| 2011/0033155 A1 | 2/2011 | Daikuhara | |
| 2011/0085766 A1 | 4/2011 | Liao et al. | |
| 2011/0091160 A1 | 4/2011 | He et al. | |
| 2011/0091161 A1 | 4/2011 | He et al. | |
| 2011/0091162 A1 | 4/2011 | He et al. | |
| 2011/0097040 A1 | 4/2011 | Lin et al. | |
| 2011/0097041 A1 | 4/2011 | Liao et al. | |
| 2011/0097042 A1 | 4/2011 | Liao et al. | |
| 2011/0097043 A1 | 4/2011 | He et al. | |
| 2011/0142401 A1 | 6/2011 | Lin et al. | |
| 2011/0158585 A1 | 6/2011 | Chang et al. | |
| 2011/0194823 A1 | 8/2011 | Wu | |
| 2011/0255825 A1 | 10/2011 | Ko et al. | |
| 2011/0299816 A1 | 12/2011 | Yen et al. | |
| 2012/0002930 A1 | 1/2012 | Lin et al. | |
| 2012/0020629 A1 | 1/2012 | Shiratori et al. | |
| 2012/0039574 A1 | 2/2012 | Laio et al. | |
| 2012/0045180 A1 | 2/2012 | Lin et al. | |
| 2012/0213477 A1 | 8/2012 | He et al. | |
| 2012/0213482 A1 | 8/2012 | Su et al. | |
| 2013/0142486 A1 | 6/2013 | Wu | |
| 2013/0148930 A1 | 6/2013 | Ko et al. | |
| 2013/0272666 A1 | 10/2013 | Qi et al. | |
| 2014/0133811 A1 | 5/2014 | Ko et al. | |

FOREIGN PATENT DOCUMENTS

| | | |
|---|---|---|
| CN | 101310417 | 11/2008 |
| CN | 101345358 | 1/2009 |
| DE | 3831322 | 8/1990 |
| DE | 19733648 | 6/1999 |
| EP | 0114230 | 8/1984 |
| JP | 64-54406 | 3/1989 |
| JP | 04-340508 | 11/1992 |
| JP | 05-113519 | 5/1993 |
| JP | 11-202166 | 7/1999 |
| JP | 2001167837 | 6/2001 |
| JP | 2002050978 | 2/2002 |
| JP | 2002082258 | 3/2002 |
| JP | 2002117948 | 4/2002 |
| JP | 2002190344 | 7/2002 |
| JP | 2003-107277 | 9/2003 |
| JP | 2004039258 | 2/2004 |
| JP | 2004-253456 | 9/2004 |
| JP | 2006-50292 | 2/2006 |
| JP | 2006-319836 | 11/2006 |
| JP | 20085535037 | 8/2008 |
| JP | 2009229613 | 10/2009 |
| JP | 2010520569 | 6/2010 |
| JP | U3160807 | 6/2010 |
| KR | 10-2006-0054914 | 5/2004 |
| KR | 1020030071425 | 3/2005 |
| KR | 10-2008-0030951 | 4/2008 |
| KR | 20080091414 | 10/2008 |
| TW | M304153 | 1/2007 |
| TW | M341336 | 9/2008 |
| TW | 200900946 | 1/2009 |

(56) References Cited

FOREIGN PATENT DOCUMENTS

| TW | M380482 | 5/2010 |
|---|---|---|
| WO | WO-2006/007421 | 1/2006 |
| WO | WO-2006077961 | 7/2006 |
| WO | WO-2007033042 | 3/2007 |
| WO | WO-2007088863 | 8/2007 |
| WO | WO-2008121731 | 10/2008 |
| WO | WO-2011034544 | 3/2011 |

OTHER PUBLICATIONS

First Office Action from Japanese Patent Application No. 2009-552939, mailed Aug. 23, 2011, 3 pages.
Notice of Allowance for Korean Patent Application No. 2009-7020350, issued Nov. 29, 2011, 3 pages.
Office Action for Korean Patent Application No. 2009-7020350, mailed Feb. 10, 2011, 4 pages.
Notice of Allowance from GB Patent Application No. GB0915900.5, mailed Apr. 15, 2011, 1 pages.
Search Report/Written Opinion: International Search Report and Written Opinion from PCT/US2008/058496 mailed Aug. 18, 2008, 9 pages.
International Preliminary Report on Patentability from PCT/US2008/058496 mailed Oct. 15, 2009, 5 pages.
First Office Action for Chinese Patent Application No. 200810100363.7, mailed Mar. 11, 2010, 5 pages.
Notice of Allowance for Chinese Patent Application No. 200810100363.7, mailed Nov. 15, 2010, 4 pages.
Office Action for Taiwan Patent Application No. 97111354, mailed Aug. 12, 2011, 4 pages.
Office Action from U.S. Appl. No. 11/731,810 mailed Sep. 13, 2011, 10 pages.
Final Office Action for Application No. 12/242,311, mailed Nov. 28, 2011, 12 pages.
Non-Final Office Action for Application No. 12/242,311, mailed Dec. 21, 2010, 9 pages.
Non-Final Office Action for Application No. 12/242,311, mailed May 25, 2011, 10 pages.
International Search Report & Written Opinion for PCT Application No. PCT/US2009/057598, mailed Jun. 11, 2010, 12 pages.
Office Action from Korean Application No. 10-2011-7007290 mailed Apr. 25, 2012, 9 pages.
Notice of Allowance from U.S. Appl. No. 11/731,810 mailed Apr. 30, 2012, 12 pages.
International Preliminary Report on Patentability from PCT/US2009/057598 mailed Mar. 29, 2012, 8 pages.
International Search Report and Written Opinion from PCT/US2011/052657 mailed Apr. 26, 2012, 12 pages.
PCT Int'l Preliminary Examination Report and Written Opinion for Int'l Application No. PCT/US2009/058304 mailed Apr. 14, 2011, 6 pgs.
Office Action from U.S. Appl. No. 12/242,311 mailed Mar. 20, 2012, 14 pages.
Final Office Action from Korean Application No. 10-2011-7007290 mailed Aug. 13, 2012, 2 pages.
Office Action from Korean Application No. 10-2011-7007290 mailed Sep. 28, 2012, 4 pages.
Final Office Action for U.S. Appl. No. 12/242,311, mailed Oct. 2, 2012, 16 pages.
Notice of Allowance from U.S. Appl. No. 11/731,810 mailed Nov. 2, 2012, 10 pages.
Office Action from U.S. Appl. No. 12/887,325 mailed Jan. 8, 2013, 12 pages.
International Preliminary Report on Patentability and Written Opinion from PCT/US2011/052657 mailed Apr. 4, 2013, 10 pages.
Office Action from U.S. Appl. No. 13/758,271 mailed Apr. 12, 2013, 12 pages.
Notice of Allowance from U.S. Appl. No. 12/887,325 mailed Jun. 17, 2013, 10 pages.
Office Action for U.S. Appl. No. 12/242,311, mailed Jul. 31, 2013, 20 pages.
Office Action from Japanese Application No. 2012-529726 mailed Jul. 30, 2013, 4 pages.
Office Action from German Application No. 11 2008 000780.2-34 mailed Jul. 26, 2013, 4 pages.
Notice of Allowance for U.S. Appl. No. 13/758,271, mailed Aug. 19, 2013, 14 pages.
"Office Action for Korean Patent Application No. 10-2012-7008334", (Oct. 28, 2013), Whole Document.
"Office Action from Chinese Application No. 200980137745.X", (Feb. 5, 2013), Whole Document.
Restriction Requirement for U.S. Appl. No. 12/887,325 mailed Nov. 14, 2012, 7 pages.
Notice of Grant for Chinese Patent Application No. 201180045219, Apr. 23, 2015, 4 pages.
Final Office Action for U.S. Appl. No. 12/242,311 mailed Feb. 26, 2014, 22 pages.
Office Action from Chinese Application No. 200980137745.X mailed Oct. 15, 2013, 20 pages.
Office Action from Chinese Application No. 200980137745.X mailed May 6, 2014, 19 pages.
Office Action from Chinese Application No. 200980137745.X mailed Nov. 4, 2014, 19 pages.
Non-Final Office Action for U.S. Appl. No. 13/496,798 mailed Sep. 22, 2014, 18 pages.
Non-Final Office Action for U.S. Appl. No. 13/496,798 mailed May 14, 2014, 14 pages.
Non-Final Office Action for U.S. Appl. No. 13/496,798 mailed Dec. 9, 2013, 16 pages.
Notice of Allowance for U.S. Appl. No. 13/496,798 mailed Feb. 3, 2015, 9 pages.
Office Action from Taiwanese (R.O.C) Application No. 98132907 mailed Jul. 25, 2012, 5 pages.
"Notice of Allowance for Taiwan Patent Application No. 100131920", (Jan. 5, 2015), Whole Document.
"Office Action and Search Report for Taiwan Patent Application No. 100131920", (May 1, 2014), Whole Document.
"Office Action for Chinese Patent Application No. 201180045219.8", (Jan. 19, 2015), Whole Document.
"Office Action for Chinese Patent Application No. 201180045219.8", (Jun. 4, 2014), Whole Document.
"Office Action for Korean Patent Application No. 10-2013-7010136", (Jan. 29, 2015), Whole Document.
"Office Action for Korean Patent Application No. 10-2013-7010136", (Jul. 11, 2014), Whole Document.
Office Action for Korean Patent Application No. 10-2013-7010136, mailed Oct. 28, 2015, 6 pgs.
Office Action for Korean Patent Application No. 10-2013-7010136, mailed Aug. 19, 2015, 3 pgs.

* cited by examiner

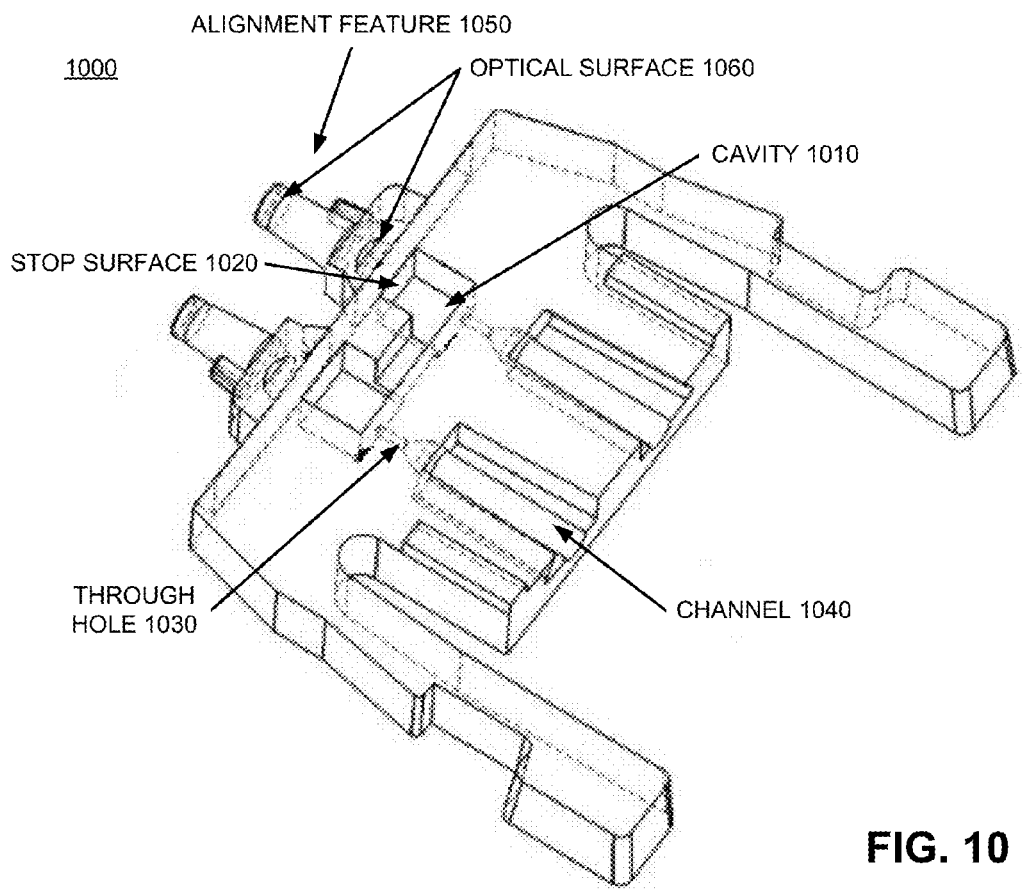
FIG. 10
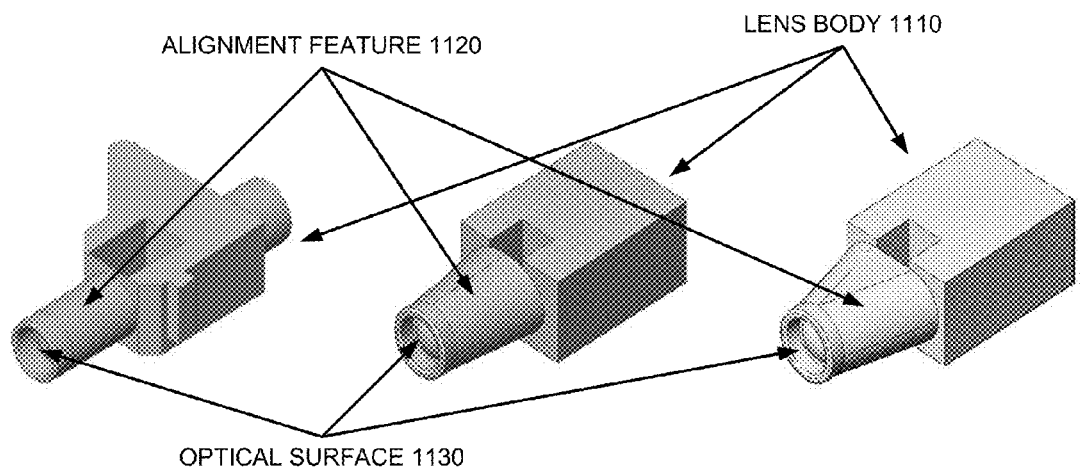
FIG. 11A  FIG. 11B  FIG. 11C

CONNECTOR OPTICAL LENS WITH ALIGNMENT FEATURES

This application is a Continuation of and claims priority to U.S. patent application Ser. No. 12/887,325 filed Sep. 21, 2010, the entire contents of which are incorporated by reference.

FIELD

Embodiments of the invention are generally related to optical interconnects, and more particularly to an optical interconnect lens with alignment features.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2010, Intel Corporation, All Rights Reserved.

BACKGROUND

Current computer platform architecture design encompasses many different interfaces to connect one device to another device. The interfaces provide I/O (input/output) for computing devices and peripherals, and may use a variety of protocols and standards to provide the I/O. The differing interfaces may also use different hardware structures to provide the interface. For example, current computer systems typically include multiple ports with corresponding connection interfaces, as implemented by physical connectors and plugs at the ends of the cables connecting the devices. Common connector types may include a Universal Serial Bus (USB) subsystem with a number of associated USB plug interfaces, DisplayPort, High Definition Multimedia Interface (HDMI), Firewire (as set forth in IEEE 1394), or other connector type.

Increased throughput on interconnects is generally considered desirable. While optical signals are known to have high bandwidth data transfer, implementing optical signal interconnecting introduces challenges in the small form factors and plug-and-unplug environments of computing devices. Usability and durability issues are introduced by common use scenarios. When connectors are unplugged, they may suffer from smudges or minor dust contamination, and repeated use may cause loosening of connectors. Thus, optical signal transfer may degrade by normal use of a connector and corresponding interface port, reducing the effectiveness of the interface.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 10 is a block diagram of an embodiment of a lens subassembly having an integrated optical surface and alignment feature.

FIGS. 11A-11C illustrate block diagrams of various embodiments of an integrated optical surface and alignment feature.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, a connection port provides electrical and/or optical interface capability. Certain embodiments describe mechanisms for interfacing and alignment. Certain embodiments describe mechanisms that reduce PCB real estate for interfaces and/or improve signal quality. In general, a combined electrical and optical interface port includes optical and electrical components within a single port, and/or corresponding plug, which may also be referred to herein as a connector and a mating or corresponding connector.

As described herein, an optical lens of an optical connector includes alignment features for passive connection alignment. Fiber inserted into the lens is aligned with a fiber groove that restricts motion in at least one direction to align the fiber. The lens includes an alignment feature to passively align the lens with a mating alignment feature of a mating connector. The connector may be for a plug and a corresponding receptacle. The mating connector may also be referred to as a corresponding connector. Embodiments may include L-, V-, or U-shaped grooves. Embodiments may include alignment posts, alignment recesses, and lenses in an alignment post or recess. Embodiments may include a tab that constrains pivoting of mating connectors when engaged.

The passive alignment structures provide improved alignment of optical signal channels to improve signal transfer efficiency. The alignment can reduce the negative effects of dust or smudge contamination by keeping a more precise line of focus of the optical signal transfer than previously achievable without the alignment features. The alignment feature provides at least one more structural component to ensure proper connection even after repeated use. The improved passive alignment can provide sufficient signal transfer efficiency to allow small profile connectors more suitable to smaller form factor computing devices.

In contrast to the traditional approach in which fibers are butt contacted to establish an optical channel, as described herein fibers are aligned against a surface that interfaces the fiber with a lens. Thus, a non-contact lens system allows for transfer of optical signals without contacting one fiber to another, which is dust sensitive. With the lenses, light beams for optical signals are expanded (collimated) and focused to reduce sensitivity to dust contamination (and other potential forms of contamination). Alignment features as described herein allow for the interfacing of the lenses without contact.

Figure 1:
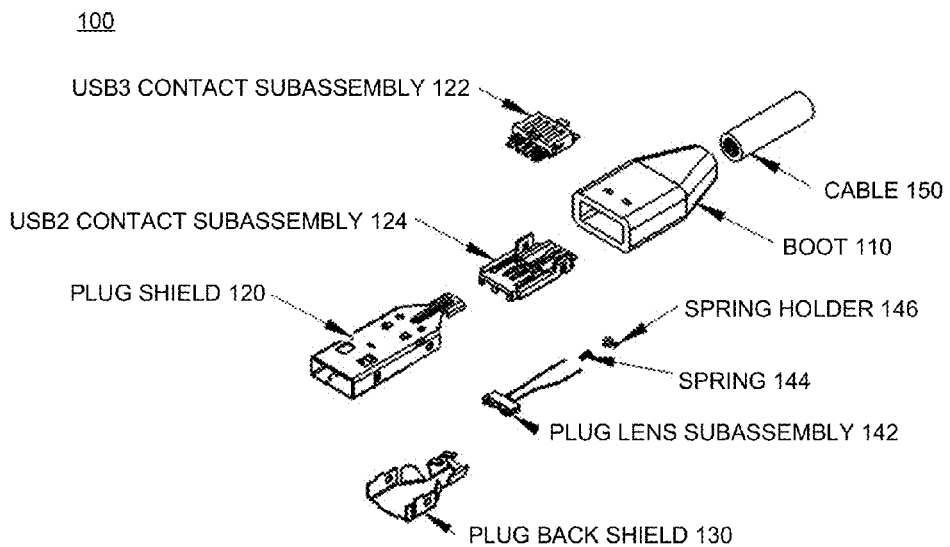
FIG. 1 is a block diagram of an embodiment of a plug assembly with a plug lens having fiber alignment grooves and alignment recesses.

FIG. 1 is a block diagram of an embodiment of a plug assembly with a plug lens having fiber alignment grooves and alignment recesses. Plug assembly 100 includes boot or overmold 110 to hold the assembly. Cable 150 extends out the back of boot 110, where the front of the boot is the area out of which the plug connector structures extend to mate with a receptacle connector. Cable 150 includes optical or optical (fibers) and electrical (wires) channels.

The plug connector structures that extend out of boot 110 are enclosed between plug front shield 120 and plug back shield 130. The shields provide positional rigidity for the plug, and EMI (electromagnetic interference) shielding when plug assembly 100 is mated with a corresponding receptacle.

Plug assembly 100 includes electrical contacts for an electrical connection in the plug connector. In one embodiment, USB2 and/or USB3 contacts are included. Thus, plug assembly 100 is illustrated showing USB2 contact subassembly 124 and USB3 contact subassembly 122. USB contact subassemblies (both typical USB2 and USB3) generally include a plastic housing in which sheet metal electrical contacts are press-fit.

Plug assembly 100 also includes plug lens subassembly 142. An embodiment of a plug lens subassembly is described in more detail with respect to FIG. 2 below. In general, it includes optical fiber alignment features as well as connector alignment features. In one embodiment, plug assembly 100 includes spring 144 to provide spring-loaded action upon plug lens subassembly 142 when installed in the plug. The spring-loaded action can improve the mechanical operation of the alignment features, exerting a force against the lens subassembly to engage the alignment features. Spring 144 may include a specific spring holder component 146. Alternatively, a spring holder may be incorporated into a body of one of the other elements making up plug assembly 100.

Plug assembly 100 represents a connector having optical signal passive alignment features. While the specific example illustrated may be referred to as a USB Standard-A connector, it will be understood that other connector types can be equally constructed as described herein. Thus, optical communication through a standard connector can be implemented in an active way by fitting electro-optical circuitry and optical components into the connector plug as shown. A similar understanding of corresponding receptacle assembly 300 of FIG. 3 will also be understood by the skilled reader.

Figure 2:
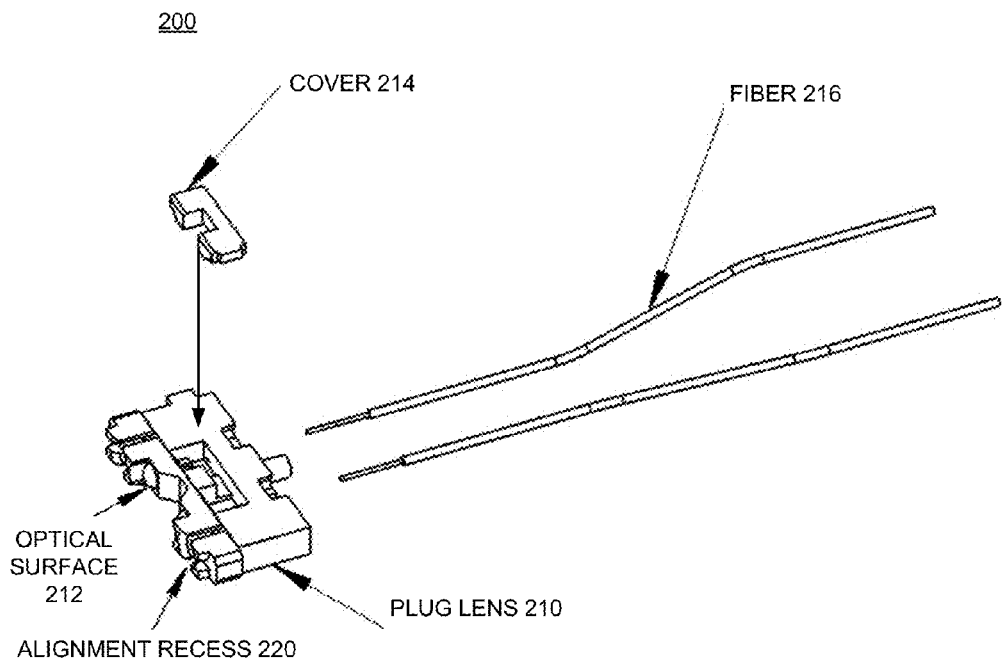
FIG. 2 is a block diagram of an embodiment of a plug lens subassembly having fiber alignment grooves and alignment recesses.

FIG. 2 is a block diagram of an embodiment of a plug lens subassembly having fiber alignment grooves and alignment recesses. In one embodiment, plug lens subassembly 200 includes plug lens 210, one or more fibers 216, and cover 214. Fiber 216 represents a clean-cleaved fiber for use in the lens subassembly. Those skilled in the art will recognize that traditional lens assemblies have relied on the use of polished fibers, which adds cost and time to manufacturing. In contrast, plug lens subassembly can be used without polishing, but merely with a clean cleaving to form a clean surface through which light can pass between an interface with a lens.

Cover 214 represents a housing component that can cover and hold in place fiber 216 as it rests in place within plug lens 210. A cover is not required in all embodiments, as described in more detail below. Cover 214 could be either metal or plastic. In one embodiment, cover 214 is press-fit into place in a cavity, and pushes against fiber 216. Alternatively, cover 214 may be glued or epoxied into place.

Plug lens 210 includes alignment recess 220, which corresponds to an alignment post. It will be understood that while an alignment recess is shown with respect to the plug assembly, and later a corresponding alignment post is shown with respect to the receptacle, the two alignment structures could be reversed. Thus, plug lens subassembly 200 could include an alignment post in place of alignment recess 220, with a corresponding alignment recess in a receptacle.

Plug lens 210 also includes optical surface 212, which represents a lens through which optical signals pass to and/or from fiber 216. Optical surface 212 can be considered to redirect light propagation. Plug lens 210 may be constructed of any appropriate material, which may include plastic, glass, silicon, or other materials that can be shaped and provide optical focusing. Plug lens 210 may include multiple materials, with at least optical surface 212 being of an appropriate material to direct or redirect light propagation.

Currently, plastic lenses are a common choice, seeing they provide convenience in cost, manufacturing, and durability. In one embodiment, plug lens 210 is designed to support expanded-beam optical interfacing. In an expanded-beam approach, plug lens 210, via optical surface 212, expands and collimates transmit signals, and focuses receive signals. See FIG. 12 below for a more detailed explanation of light or beam expansion for use in optical signal exchange. As is understood by those skilled in the art, collimating refers to making the photons of the light signal more parallel in reception.

Figure 3:
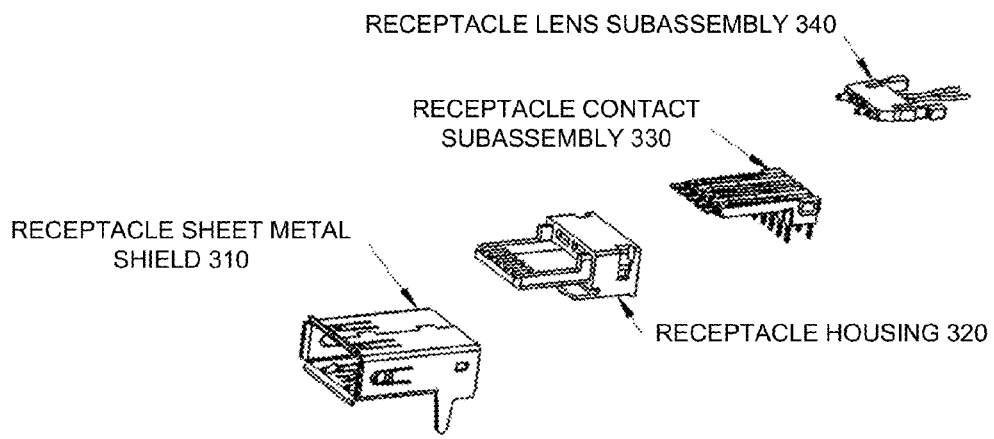
FIG. 3 is a block diagram of an embodiment of a receptacle assembly with a receptacle lens having fiber alignment grooves and alignment posts.

FIG. 3 is a block diagram of an embodiment of a receptacle assembly with a receptacle lens having fiber alignment grooves and alignment posts. Receptacle assembly 300 includes receptacle sheet metal shield 310, receptacle housing, receptacle contact subassembly 330, and receptacle lens subassembly 340. Receptacle assembly 300 is commonly constructed on a printed circuit board (PCB), but could also be assembled into a standalone cable (e.g., an extender cable).

Shield 310 provides positional rigidity for the receptacle, and EMI shielding when receptacle assembly 300 is mated with a corresponding plug. Receptacle assembly 300 includes electrical contacts for an electrical connection in the plug connector. In one embodiment, USB2 and/or USB3 contacts are included. Thus, contact subassembly 330 of receptacle assembly 300 may include USB2 and/or USB3 contacts. USB contacts may be press-fit into a plastic housing (e.g., housing 320).

Receptacle assembly 300 also includes receptacle lens subassembly 340. An embodiment of a receptacle lens subassembly is described in more detail with respect to FIG. 4 below. In general, it includes optical fiber alignment features as well as connector alignment features. Receptacle assembly 300 represents a connector having optical signal passive alignment features.

Figure 4:
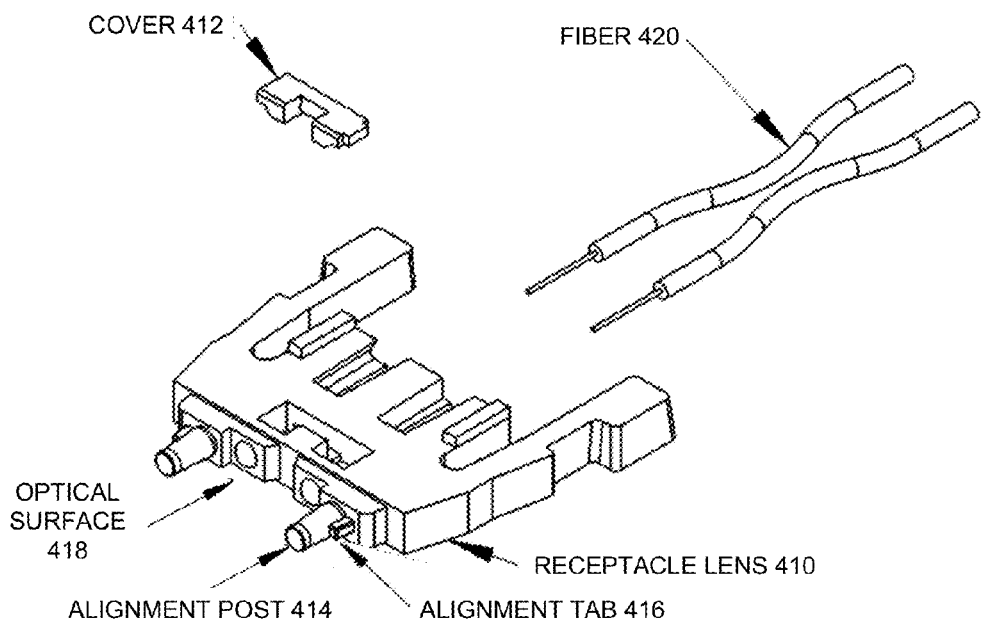
FIG. 4 is a block diagram of an embodiment of a receptacle lens subassembly having fiber alignment grooves and alignment posts.

FIG. 4 is a block diagram of an embodiment of a receptacle lens subassembly having fiber alignment grooves and alignment posts. In one embodiment, receptacle lens subassembly 400 includes receptacle lens 410, one or more fibers 420, and cover 412. Fiber 420 represents a clean-cleaved fiber for use in the lens subassembly. As mentioned above, fiber 420 need not be polished, but may be prepared merely with a clean cleaving to form a clean surface through which light can pass between an interface with a lens.

Cover 412 represents a housing component that can cover and hold in place fiber 420 as it rests in place within receptacle lens 410. A cover is not required in all embodiments, as described in more detail below. Cover 412 could be either metal or plastic. In one embodiment, cover 412 is press-fit into place in a cavity, and pushes against fiber 420. Alternatively, cover 412 may be glued or epoxied into place.

Receptacle lens 410 includes alignment post 414, which corresponds to an alignment recess in a mating connector. It will be understood that while an alignment post is shown with respect to the receptacle subassembly to mate with an alignment recess of a plug subassembly, the two alignment structures could be reversed. Thus, receptacle lens subassembly 400 could include an alignment recess in place of alignment post 414, with a corresponding alignment post in a plug.

In one embodiment, receptacle lens 410 includes a groove (discussed in more detail below) for fiber 420 to rest upon. Receptacle lens has optical lens surfaces to redirect light propagation. Receptacle lens 410 also includes optical surface 418, which represents a lens through which optical signals pass to and/or from fiber 420. Optical surface 418 can be considered to redirect light propagation. Receptacle lens 410 may be constructed of any appropriate material, which may include plastic, glass, silicon, or other materials that can be shaped and provide optical focusing. Receptacle lens 410 may include multiple materials, with at least optical surface 418 being of an appropriate material to direct or redirect light propagation.

Currently, plastic lenses are a common choice, seeing they provide convenience in cost, manufacturing, and durability. In one embodiment, receptacle lens 410 is designed to support expanded-beam optical interfacing. In an expanded-beam approach, receptacle lens 410, via optical surface 418, expands and collimates transmit signals, and focuses receive signals. See FIG. 12 below for a more detailed explanation of light or beam expansion for use in optical signal exchange. As is understood by those skilled in the art, collimating refers to making the photons of the light signal more parallel in reception.

In one embodiment, receptacle lens subassembly 400 includes alignment tab 416 in addition to alignment post 414. A plug subassembly may include a corresponding recess for alignment tab 416. While alignment post 414 can center and align optical surface 418 with a corresponding optical surface on a plug subassembly, alignment tab 416 reduces tilt or pivoting of the lenses with respect to each other. Thus, in an ideal configuration of both the plug and receptacle, the alignment post and corresponding recess engage the two subassemblies and align the optical surfaces, with the plug and receptacle co-planar along a direction of propagation of the optical signal. Alignment tab 416 and a corresponding mating recess engage and restrict tilt or pivoting in that plane. Thus, alignment tab 416 restrains or restricts motion of the lens in the plane of the line of the direction of optical signal propagation, keeping the lenses aligned.

It will be understood that alignment tab 416 may alternatively be located on a plug subassembly. Additionally, while there may be convenience in manufacturing, there is no strict requirement that the alignment tab be on the same device as the alignment post. Thus, a receptacle could have an alignment tab while the plug has an alignment post, and each has corresponding recesses or notches.

While a specific example of a plug, a receptacle, a plug lens, and a receptacle lens are described generally with respect to various embodiments, further detail about various embodiments is described in more detail below.

In general, alignment features are included on a plug and a receptacle with corresponding mating features on the other. The alignment features allow passive alignment and more precise coupling of the connectors for optical signal transfer between them. Each subassembly (both the receptacle and plug) includes an optical surface in a housing of the subassembly through which to exchange optical signals. Each subassembly also includes connector alignment features to passive align the subassembly to a mating assembly along a line of focus or a line of propagation of the optical signal.

Fibers are inserted in the subassemblies and interface with the optical surface via a fiber stop surface. In one embodiment, the subassembly includes a fiber alignment structure in the subassembly lens housing. The fiber alignment can include guide holes or through holes, grooves, and/or cavities. In one embodiment, the alignment structure restricts motion of the optical fiber in at least one axis orthogonal to the line of focus. Thus, the optical fiber is aligned by keeping the fiber pointed in the direction of propagation of the signal.

Variations on the general concepts include disposing an optical lens in the alignment mechanism. Thus, an alignment post may include the optical lens surface. A corresponding optical surface may be disposed at the end of a mating alignment hole or recess. Fiber alignment can be accomplished through a blind hole having a diameter approximately the same as the optical fiber, or with a groove in the lens housing. The lens may be an L-shaped, U-shaped groove, V-shaped groove.

It will be understood that in addition to use with many different connector types, the uses of the connectors have general applicability to computing devices. Thus, a plug or a receptacle connector can be used with any number of devices including a desktop or laptop computer, a netbook, or other such device.

Besides computing devices, it will be understood that many other types of electronic devices may incorporate the one or more of the types of connector discussed herein, and the embodiments described herein would apply equally well in such electronic devices. Examples of other such electronic devices may include handheld devices, smartphones, media devices, multimedia devices, memory devices, storage devices, cameras, voice recorders, I/O devices, networking devices, gaming devices, gaming consoles, televisions or audio/visual (A/V) equipment, or any other electronic device that might include such a connector.

Connectors such as those described herein are commonly used to connect peripheral devices (which may be any of the same types of devices discussed above) to interconnect with a host device. A plug may be built directly into a peripheral device (with or without a cord), or may be interconnected to another device via a standalone cable.

Discussion herein of mating one connector with another refers to providing a mechanical and communicative connection. The mating of one connector with another typically also provides a communication connection. The mating of the connectors occurs via the housing and alignment features, and typically includes contact of the electrical contacts and alignment of fiber optical signal transmission elements. The connection interface via the combined connector allows either electrical I/O or optical I/O or both via the different interfaces incorporated within the connector housing. Electrical I/O and optical I/O may occur simultaneously, or substantially simultaneously, or may be configured to operate separately or "take turns."

The various assemblies described herein could each also be referred to as a "subassembly." Technically, an assembly may refer to a "finished" product, or a finished system or subsystem of a manufactured item, while a subassembly generally is combined with other components or another subassembly to complete a subassembly. However, a subassembly is not distinguished from an 'assembly' herein, and use of the different terms is solely for convenience in description. Reference to an assembly may refer to what may otherwise be considered a subassembly.

The electrical protocols or standards that may be used could include universal serial bus (USB) (standard or mini), high-definition multimedia interface (HDMI), or DisplayPort. It will be understood that each different standard may include a different configuration or pinout for the electrical contact assembly. Additionally, the size, shape and configuration of the connector housing is dependent on the standard, including tolerances for the mating of the corresponding connectors. Thus, the layout of a connector that integrates optical I/O with electrical I/O may be different for the various standards. As will be understood by those of skill in the art, optical interfaces require line-of-sight connections to have an optical signal transmitter interface with a receiver (both may be referred to as lenses). Thus, the configuration of the connector will be such that the lenses are not obstructed by the corresponding electrical contact assemblies. For example, optical interface lenses can be positioned to the sides of the contact assemblies, or above or below, depending on where space is available within the connector housing.

Figure 5:
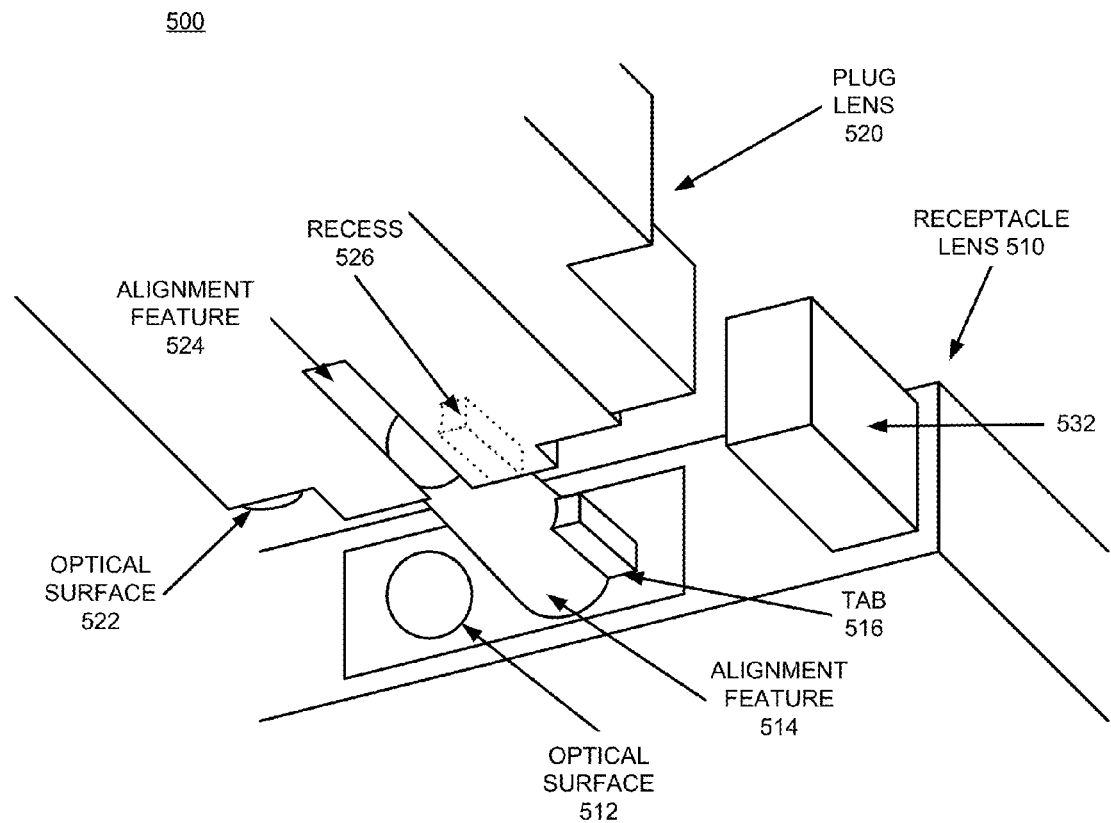
FIG. 5 is a block diagram of an embodiment of an interconnection between a plug lens subassembly and a receptacle lens subassembly each having mating alignment features.

FIG. 5 is a block diagram of an embodiment of an interconnection between a plug lens subassembly and a receptacle lens subassembly each having mating alignment features. Interconnection 500 illustrates an interconnection to establish an optical link with a plug and receptacle as described herein. In the embodiment of interconnection 500, the plug assembly includes alignment recesses, while the receptacle assembly includes corresponding alignment protrusions.

To establish the optical link, the plug assembly is inserted into the receptacle assembly. The plug assembly includes plug lens 520, which has optical surface 522, alignment feature 524, and recess 526. The receptacle assembly includes receptacle lens 510, which has corresponding optical surface 512, alignment feature 514, and tab 516, respectively. Other "plugging" features may be included such as protrusion 532 in the housing of receptacle lens 510, which engages with a space in the housing of plug lens 520.

Once the plug assembly is inserted into the receptacle assembly and has traveled close to the end of engaging depth of the receptacle assembly, alignment pins (e.g., alignment feature 514 and tab 516) of the body of receptacle lens 510 will start engaging alignment holes (e.g., alignment feature 524 and recess 526, respectively) of plug lens 520. In one embodiment, when the plug assembly is fully inserted into the receptacle assembly, both lenses are fully engaged and at the same time plug lens 520 is pushed backward inside the plug assembly. Plug lens 520 may be pushed back if the lens is spring loaded in the plug assembly. Thus, the spring force applied onto plug lens 520 can keep both lens engaged. As long as both lenses are engaged, light may travel from either side through the connector.

In one embodiment, the feature to facilitate fiber termination shown in both the plug lens and the receptacle lens may be referred to as a groove. The fiber may be passed through a through hole in the body of the lens for macro-alignment, and then rest upon the groove to position it accurately with respect to the optical surface of the lens body. It will be understood that the expression "lens" may be used a couple of different ways herein, one to refer to the body or housing that includes the optical surface, and the other to the optical surface itself. Context should make understandable the meaning that is intended. The fiber butts against a stop surface in the lens body to align it with the optical surface. When multiple fibers are used in a single lens, multiple through holes and grooves may be used, one for each fiber. To secure the position of the fibers, in one embodiment a cover is press fit into the lens body, where the cover has an angled surface to push the fibers against the groove.

The drawings and descriptions of FIGS. 6-9 illustrate certain detail with respect to the fiber alignment, as well as other features. It will be understood that the receptacle lens is used to illustrate the fiber alignment and other features, but the same features could be applied to the plug lens subassembly.

Figure 6:
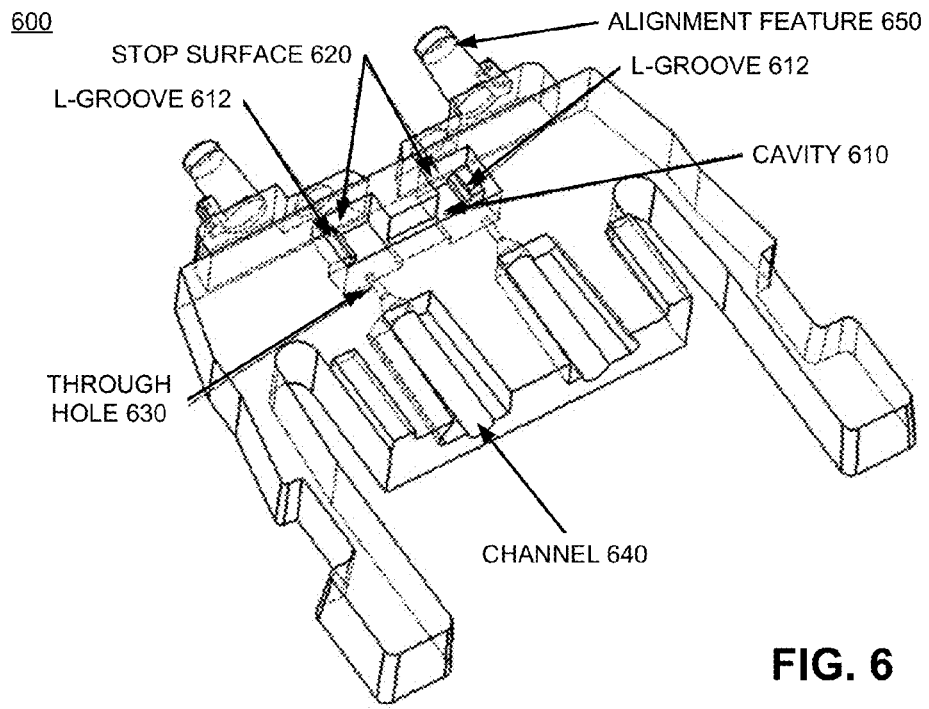
FIG. 6 is a block diagram of an embodiment of a lens subassembly having L-groove fiber alignment.

FIG. 6 is a block diagram of an embodiment of a lens subassembly having L-groove fiber alignment. Lens 600 includes cavity 610 in which L-grooves 612 are located (i.e., lens 600 accommodates two fibers). L-groove 612 is "L-shaped" because the groove is formed by a base with a single wall on one side extending up vertically from the base, to form a cross-sectional view to appear generally like an L or a reverse L. The vertical portion and the base form essentially a right angle or close to a right angle. The intersection between the base and the vertical portion may not be a hard corner, but could be rounded.

Stop surface 620 represents a face in cavity 610 through which a fiber interfaces with the optical surface (or lens), which is shown on the other side of the lens body as cavity 610. As seen, stop surface 620 is in a perpendicular plane to the direction of the line of focus of lens 600. The fiber is thus aligned against stop surface 620, with the length of the fiber aligned to a line of focus of the optical surface. The optical surface may focus light and pass light to and/or from the fiber, with the focus of the optical surface being in a direction of the focus of lens 600. Resting the fiber against L-groove 612 and against stop surface 620 aligns the fiber with the optical surface.

A fiber can be inserted along channel 640 through throughhole 630 for macro-alignment, and resting upon L-groove 612 and butting against stop surface 620 for micro-alignment. A cover can secure the fiber in place against the groove. Alignment feature 650 is for alignment of the connector to a corresponding mating connector.

Figure 7:
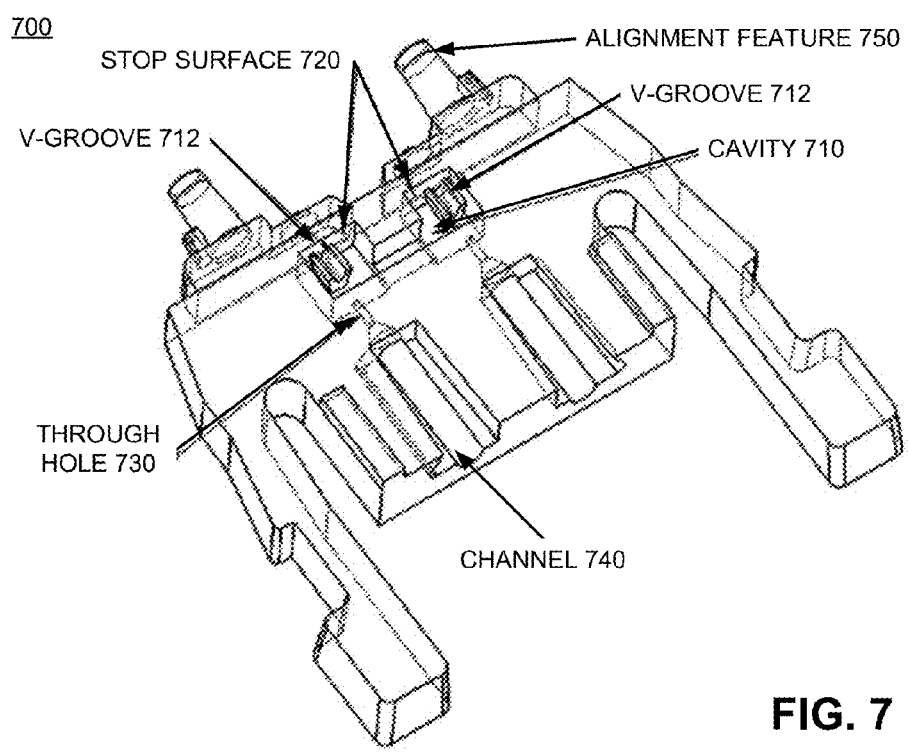
FIG. 7 is a block diagram of an embodiment of a lens subassembly having V-groove fiber alignment.

FIG. 7 is a block diagram of an embodiment of a lens subassembly having V-groove fiber alignment. Lens 700 includes cavity 710 in which V-grooves 712 are located (i.e., lens 700 accommodates two fibers). V-groove 712 is "V-shaped" because the groove is formed by two walls extending up in a way that forms an angle between the walls. The angle of the V can be configured for a fiber diameter. The V-groove is a channel adjacent the stop surface, which is itself adjacent the optical surface of lens 700. The intersection between the angled walls may not be a hard angle, but could be rounded.

Stop surface 720 represents a face in cavity 710 through which a fiber interfaces with the optical surface (or lens), which is shown on the other side of the lens body as cavity 710. As seen, stop surface 720 is in a perpendicular plane to the direction of the line of focus of lens 700. The fiber is thus aligned against stop surface 720, with the length of the fiber aligned to a line of focus of the optical surface. The optical surface may focus light and pass light to and/or from the fiber, with the focus of the optical surface being in a direction of the focus of the lens 700. Resting the fiber against V-groove 712 and against stop surface 720 aligns the fiber with the optical surface.

A fiber can be inserted along channel 740 through through-hole 730 for macro-alignment, and resting upon V-groove 712 and butting against stop surface 720 for micro-alignment. A cover can secure the fiber in place against the groove. Alignment feature 750 is for alignment of the connector to a corresponding mating connector.

Figure 8:
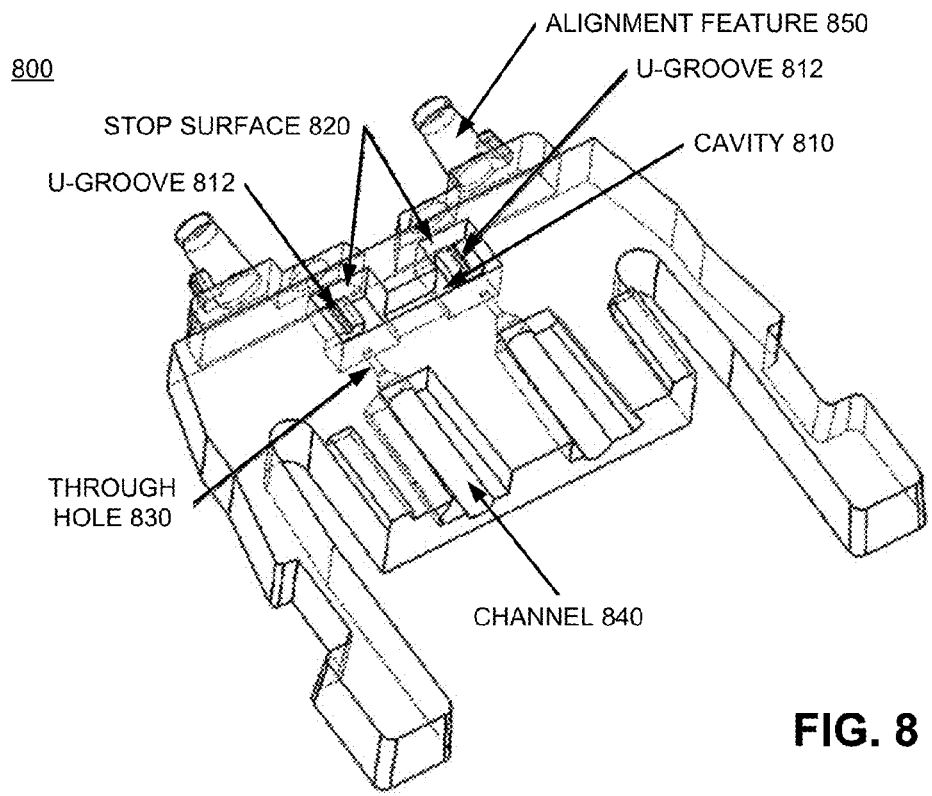
FIG. 8 is a block diagram of an embodiment of a lens subassembly having U-groove fiber alignment.

FIG. 8 is a block diagram of an embodiment of a lens subassembly having U-groove fiber alignment. Lens 800 includes cavity 810 in which U-grooves 812 are located (i.e., lens 800 accommodates two fibers). U-groove 812 is "U-shaped" because the groove includes two walls extending up at approximately the same angle, making the two extending walls approximately parallel to each other. The U-groove could be conceptualized as two facing L-grooves, or a V-groove in which a base is added between the two extending edges or walls. The width of the U can be configured for a fiber diameter. The U-groove is a channel adjacent the stop surface, which is itself adjacent the optical surface of lens 800. The U-channel of U-groove 812 could have hard angled intersections or could be rounded.

Stop surface 820 represents a face in cavity 810 through which a fiber interfaces with the optical surface (or lens), which is shown on the other side of the lens body as cavity 810. As seen, stop surface 820 is in a perpendicular plane to the direction of the line of focus of lens 800. The fiber is thus aligned against stop surface 820, with the length of the fiber aligned to a line of focus of the optical surface. The optical surface may focus light and pass light to and/or from the fiber, with the focus of the optical surface being in a direction of the focus of lens 800. Resting the fiber against U-groove 812 and against stop surface 820 aligns the fiber with the optical surface.

A fiber can be inserted along channel 840 through through-hole 830 for macro-alignment, and resting upon U-groove 812 and butting against stop surface 820 for micro-alignment. A cover can secure the fiber in place against the groove. Alignment feature 850 is for alignment of the connector to a corresponding mating connector.

Figure 9:
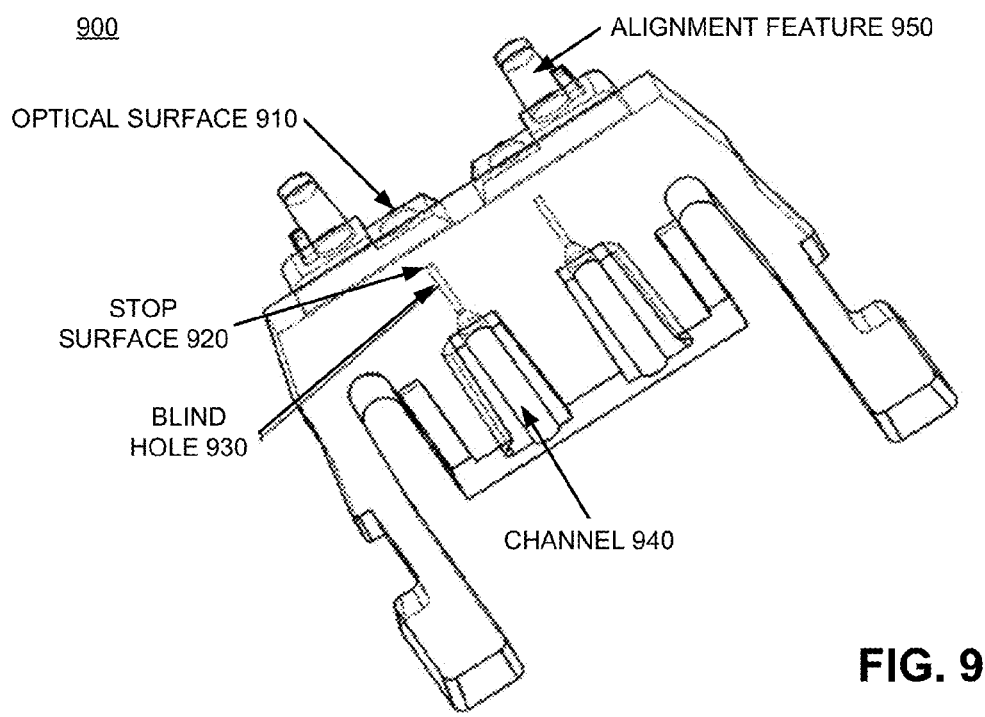
FIG. 9 is a block diagram of an embodiment of a lens subassembly having blind-hole fiber alignment.

FIG. 9 is a block diagram of an embodiment of a lens subassembly having blind-hole fiber alignment. Lens 900 includes does not include a cavity, but instead has a blind-hole 930 for each fiber the lens can accommodate (e.g., lens 900 is illustrated as accommodating two fibers). Each blind-hole 930 has a stop surface 920 at the end of the blind-hole. A fiber is inserted along channel 940 into blind-hole 930 to the end of the blind-hole.

Stop surface 920 represents a face in the lens body through which a fiber interfaces with optical surface (or lens) 910. As seen, stop surface 920 is in a perpendicular plane to the direction of the line of focus of lens 900. The fiber is thus aligned against stop surface 920, with the length of the fiber aligned to a line of focus of the optical surface. The optical surface may focus light and pass light to and/or from the fiber, with the focus of the optical surface being in a direction of the focus of the lens 900.

Rather than using blind-hole 930 for macro-alignment, careful engineering (both design and manufacturing) of the blind-hole can enable micro alignment of the fiber to optical surface 910. Alignment feature 950 is for alignment of the connector to a corresponding mating connector. In one embodiment, blind-hole 930 has a circular cross-section, but other cross sections could be used (although manufacturing of the circular blind-hole is currently easiest). Blind-hole 930 is similar to the through-holes of the previous examples, but does not extend through the material; thus, it is a more properly called a blind-hole rather than a through-hole.

FIG. 10 is a block diagram of an embodiment of a lens subassembly having an integrated optical surface and alignment feature. Lens 1000 includes cavity 1010, which does not include grooves. Fiber is inserted along channel 1040, passes through an accurately positioned and sized through-hole 1030, and butts against stop surface 1020. In one embodiment, no cover is used when grooves are not used.

Stop surface 1020 represents a face in cavity 1010 through which a fiber interfaces with optical surface (or lens) 1060, which is integrated into alignment feature 1050. As seen, stop surface 1020 is in a perpendicular plane to the direction of the line of focus of lens 1000. The fiber is thus aligned against stop surface 1020, with the length of the fiber aligned to a line of focus of the optical surface. The optical surface may focus light and pass light to and/or from the fiber, with the focus of the optical surface being in a direction of the focus of lens 1000. The walls and/or base of cavity 1010 may be used to align the fiber. Thus, the wall of the cavity could act similarly to the L-groove of FIG. 6, without requiring the additional structure of the L-groove. However, more precision would be required in making the cavity.

As mentioned, the position and size of through-hole 1030 can be made to directly align the fiber against stop surface 1020 to allow alignment of the fiber with optical surface 1060. The use of the grooves can allow for less precision in the positioning and sizing of the through-hole. Similarly, without a cavity and simply using blind-hole (see FIG. 9), the positioning and size of the blind-hole must be carefully controlled to align the fiber precisely with the line of focus of the lens subassembly.

In one embodiment, optical surface 1060 is incorporated within alignment feature 1050. It will be understood that such an incorporation of the optical surface into the alignment feature can be applied to any of the other examples of FIGS. 6-9 above. The optical surface can be placed at the end of the alignment feature (i.e., the first portion of the alignment feature to engage with the mating connector, or the portion of furthest protrusion), or could be placed within the post at some other location. Alternative locations are shown as the end of alignment feature 1050, and at the beginning near the body of lens 1000. In one embodiment, alignment feature 1050 is hollow, with optical surface 1060 at or closer to the beginning of the post, nearer the body of the lens subassembly.

Tabs (shown but not labeled) may or may not be used with integrated alignment feature and optical surface.

As mentioned above, the various grooves and other fiber alignment can also be applied to a plug lens, while the illustrations show the techniques with respect to a receptacle lens.

FIGS. 11A-11C illustrate block diagrams of various embodiments of an integrated optical surface and alignment feature. When the integrated optical surface is integrated into an alignment post, the result can be the same or similar to any of FIG. 11A, 11B, or 11C. Lens body 1110 refers to a portion of the body or housing of the subassembly on which alignment feature or alignment post 1120 is attached. The other portions of lens body 1110 could include one or more of cavities, through-holes, blind-holes, grooves, or tabs, or some combination. It will be understood from the discussions above that not all combinations make sense (e.g., a combination of a blind-hole and a cavity). Optical surface 1130 is illustrated at the end of alignment feature 1020, but is not necessarily at the end, and could be set back into the alignment feature.

Referring to FIG. 11A, lens body 1110 includes alignment feature 1120, which is a cylinder having a diameter at the end approximately the same as the diameter at the beginning Optical surface 1130 is integrated into alignment feature 1120.

Referring to FIG. 11B, lens body 1110 includes alignment feature 1120, which is a canonical cylinder having a diameter at the end different and smaller than the diameter at the beginning. Thus, alignment feature 1120 narrows or tapers like a cone as it extends out from lens body 1110. Optical surface 1130 is integrated into alignment feature 1120.

Referring to FIG. 11C, lens body 1110 includes alignment feature 1120, which a post having a circular cross-section at the end, and a different cross section at the beginning at lens body 1110. The different cross-section could be an oval or a capsule shaped cross section. The capsule cross section is any shape that has approximately parallel sides with rounded ends. Thus, alignment feature 1120 tapers along certain lines as it extends out from lens body 1110, and simply extends straight out along other lines. Optical surface 1130 is integrated into alignment feature 1120.

Figure 12:
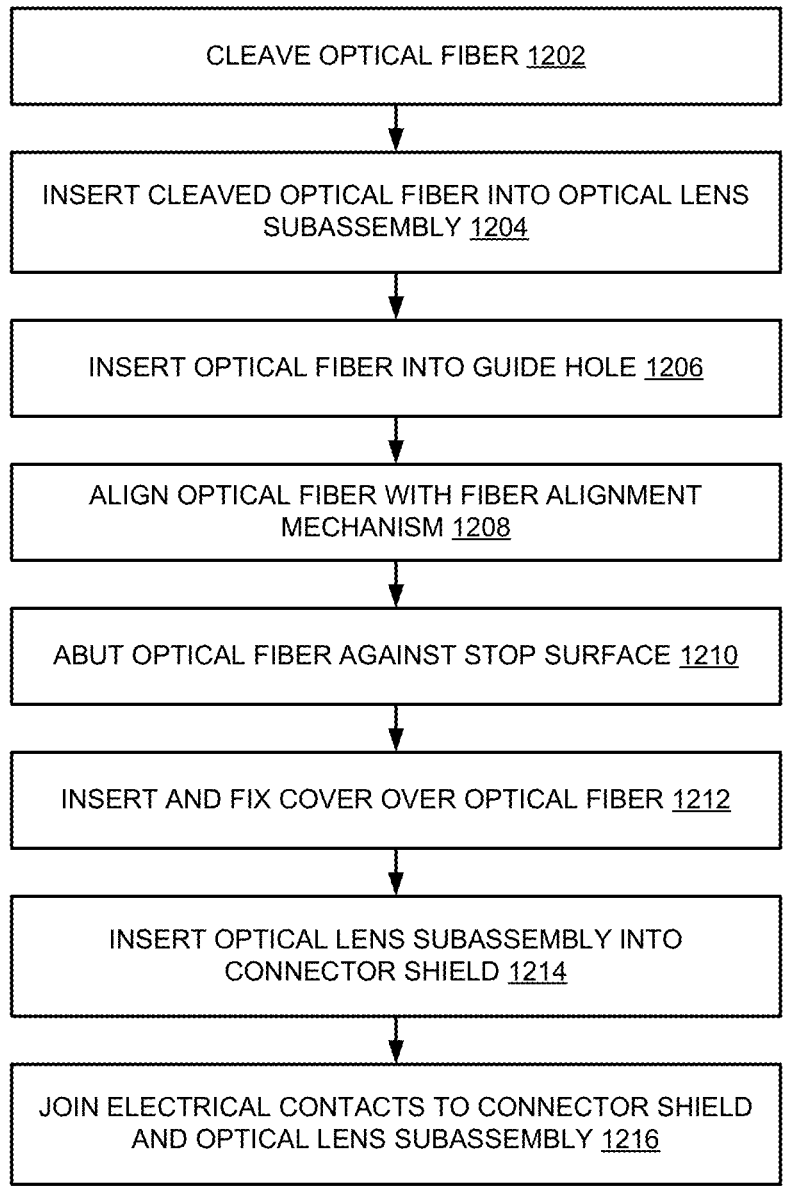
FIG. 12 is a flow diagram of an embodiment of manufacturing a lens assembly having alignment features.

FIG. 12 is a flow diagram of an embodiment of manufacturing a lens assembly having alignment features. Flow diagrams as illustrated herein provide examples of sequences of various process actions, which may be performed by processing logic that may include hardware, software, or a combination. Although shown in a particular sequence or order, unless otherwise specified, the order of the actions can be modified. Thus, the illustrated implementations should be understood only as an example, and the process can be performed in a different order, and some actions may be performed in parallel. Additionally, one or more operations can be omitted in various embodiments of the invention; thus, not all actions are required in every implementation. Other process flows are possible.

An optical fiber is clean-cleaved in preparation for insertion into a lens subassembly, 1202. The lens subassembly could be either a receptacle connector or a plug connector. The optical fiber is inserted into an optical lens subassembly, 1204. The optical lens subassembly has a lens housing, a guide hole (either a blind-hole or a through-hole), a stop surface, and an optical surface or optical lens. The fiber is inserted into the guide hole and through to the stop surface, 1206.

The optical fiber is inserted into the guide hole and aligned with a fiber alignment mechanism, 1208. In one embodiment, the fiber alignment mechanism includes a blind-hole, and the guide-hole is the blind-hole. In one embodiment, the guide hole is a through-hole and the fiber alignment mechanism is a groove. In one embodiment, the guide hole is a through-hole and the fiber alignment is accomplished by careful placement of the through-hole and shaping of the through-hole and a wall of a cavity. Thus, inserting the fiber into the guide hole includes passively aligning the fiber.

The optical fiber is abutted against a stop surface in the lens body, 1210. In embodiments where a cavity is used, a cover may be inserted and fixed over the optical fiber(s), 1212. In embodiments where no cavity is used, no cover is required. In embodiments where the cavity and through-hole are precisely shaped and positioned, the cavity may not be required.

The optical lens subassembly is inserted into a connector shield to provide an optical communication channel in a connector, 1214. The connector shield can be either a receptacle shield or a plug shield. It will be understood that similar methods of putting together the assemblies may be used, while variations in the structures of the lens bodies may exist. However, the same method of aligning the fiber simply by inserting it into the lens body, and optionally inserting a cover, is the same for either.

In one embodiment, the optical lens is to be part of a joint optical and electrical connector. Thus, electrical contacts may be joined to the connector shield to enable an electrical communication channel in the connector, 1216. Joining the electrical contacts may include joining USB contacts. The USB contacts may include one or both of USB2 contacts or USB3 contacts.

Figure 13:
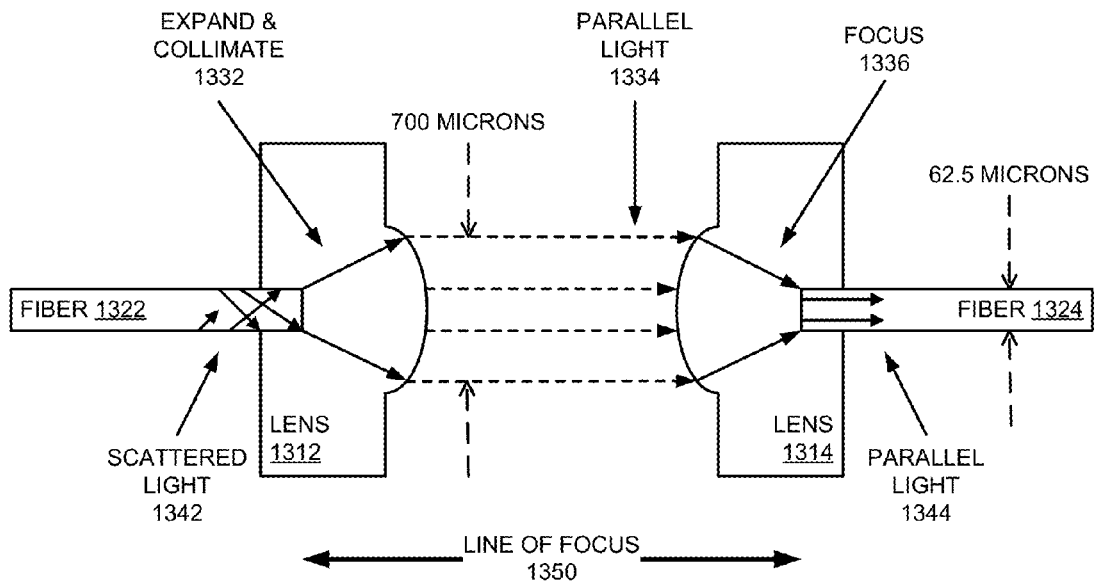
FIG. 13 is a block diagram of an embodiment of beam expansion.

FIG. 13 is a block diagram of an embodiment of beam expansion. As illustrated, an optical signal is passed through fiber 1322, and to be transferred to fiber 1324. The optical beam in fiber 1322 is expanded and collimated 1332 by lens 1312, and can then be interfaced as a wider beam to lens 1314. As shown in the example provided, fibers 1322 and 1324 may be approximately 62.5 microns in diameter, while the expanded beam is passed between lenses 1312 and 1314 with a diameter of approximately 700 microns. The expansion of the beam makes it possible to optically couple fibers 1322 and 1324, where traditional butt coupling would not provide adequate performance for the mechanical tolerances of most connector. Even a slight offset could cause a significant signal loss for a non-expanded beam—even just a few microns offset could lose more than 10% of the signal or more. However, with the beam expansion, mechanical tolerance is improved, as is tolerance to dust or other optical obstructions.

While the optical beam within fiber 1322 may consist of highly parallel photons, for purposes of illustration, fiber 1322 is shown to include scattered light 1342. Even for a situation where an optical beam has scattered light within a fiber, the expansion and collimating (1332) improves optical signal quality by directing the photons more parallel. Thus, parallel light 1334 is shown transferred between lenses 1312 and 1314. The optical beam is focused 1336 by lens 1314, and parallel light 1344 is transmitted through fiber 1324.

As used herein, "line of focus" refers to a hypothetical line that would extend through and out both directions of the lens based on the focus of the lens. As illustrated, lenses 1312 and 1314 have the same line of focus 1350, illustrating the ideal alignment. Light from fiber 1322 is "focused" through expansion and collimation to parallel light 1344, showing the line of focus of lens 1312. If light were received at lens 1312, the same lens shape would focus light to the same line of focus 1350 into fiber 1322. At lens 1314, the discussion is the same, but reversed. Light is focused to parallel light 1344, but would be expanded to propagate parallel to parallel light 1344 if transmitted from lens 1314 rather than received at the lens.

To the extent various operations or functions are described herein, they may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
    inserting a clean-cleaved optical fiber into an optical lens subassembly,
        wherein the optical lens subassembly includes a lens housing having an optical lens disposed on the housing through which to exchange optical signals, a stop surface in the lens housing along a line of focus of light propagation through the optical lens, a fiber alignment mechanism in the lens housing adjacent the stop surface along the line of focus, and a connector alignment mechanism disposed on the lens housing to passively align a mating assembly to the optical lens along the line of focus, and
        wherein inserting the optical fiber into the optical lens subassembly includes inserting the optical fiber through a guide hole in the lens housing to rest against the fiber alignment mechanism and to abut the stop surface, to align and interface the optical fiber to the optical lens, while restricting lateral motion of the optical fiber in at least one axis orthogonal to the line of focus;
    inserting the optical lens subassembly into a connector shield to provide an optical communication channel in a connector; and
    joining electrical contacts to connector shield to enable an electrical communication channel in the connector.

2. The method of claim 1, wherein inserting the optical lens subassembly into the connector shield comprises:
    inserting the optical lens subassembly into a joint optical and electrical connector receptacle shield.

3. The method of claim 1, wherein inserting the optical lens subassembly into the connector shield comprises:
    inserting the optical lens subassembly into a joint optical and electrical connector plug shield.

4. The method of claim 1, wherein joining the electrical contacts to the connector shield comprises:
    joining electrical contacts for a universal serial bus (USB) connector.

5. The method of claim 1, wherein joining the electrical contacts for the USB connector further comprises:
    joining electrical contacts for a USB2 connector, a USB3 connector, or both.

* * * * *